even them, and thereby give to them greater endurance against wear and abrasion; it also gives
UNITED STATES PATENT OFFICE.

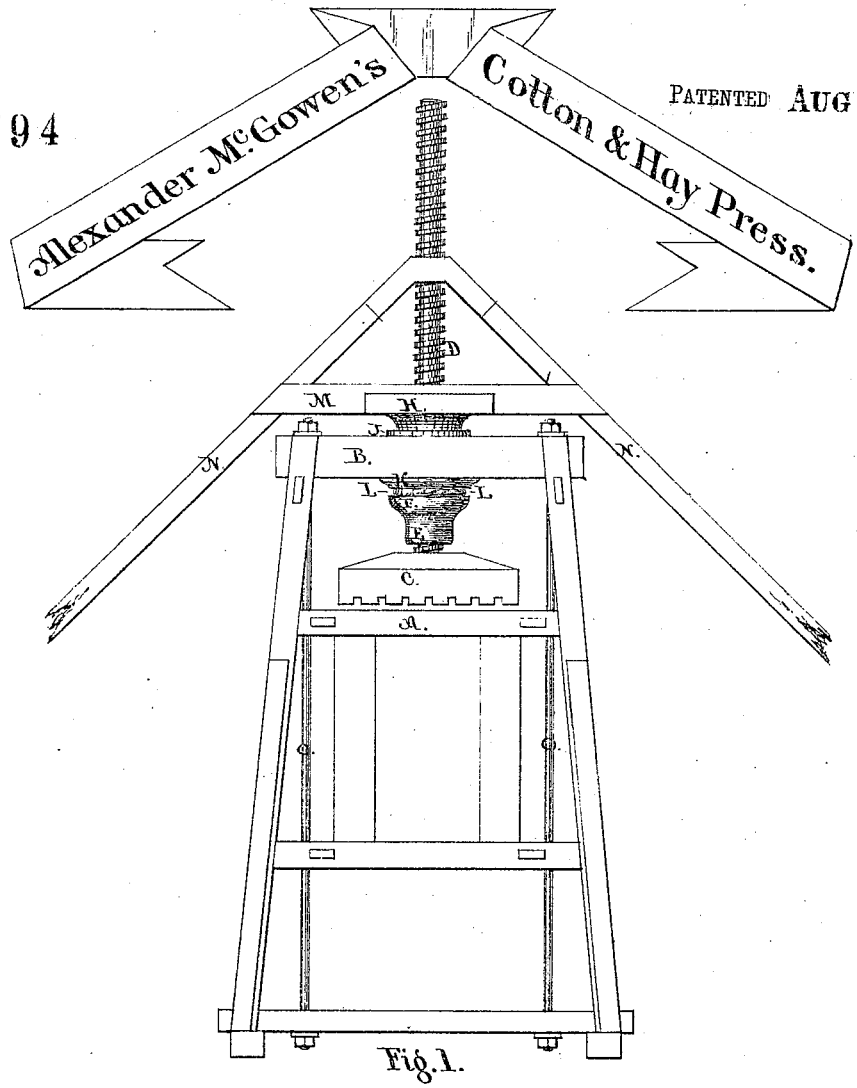
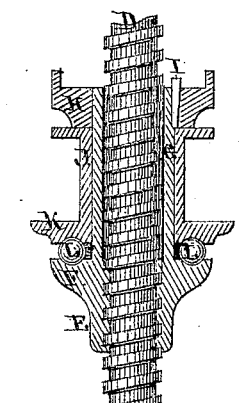
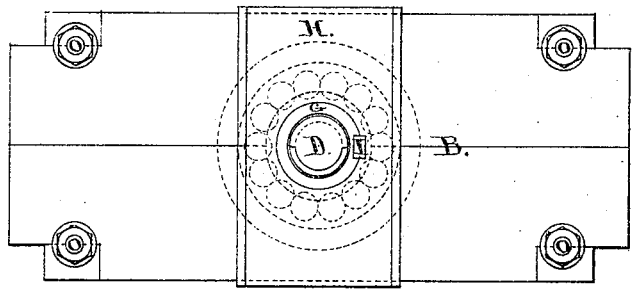

ALEXANDER McGOWEN, OF HOUSTON, TEXAS.

IMPROVEMENT IN COTTON AND HAY-PRESSES.

Specification forming part of Letters Patent No. 117,794, dated August 8, 1871.

*To all whom it may concern:*

Be it known that I, ALEXANDER McGOWEN, of Houston, in the county of Harris and State of Texas, have invented certain Improvements in Cotton and Hay-Presses, of which the following is a full and exact description, reference being had to the accompanying drawing making a part of this specification, in which—

Figure 1 is a front elevation of the press; Fig. 2, a sectional view of the nut and sleeve with a portion of the screw; and Fig. 3, a plan view of the same.

The nature of my invention consists: First, in extending the revolving nut below the bearing where the pressure comes upon it, so that all or nearly all of its threads may be below this point; the object of this is to change the nature of the strain usually thrown upon the nut—that is to say, from a strain of tension to one of compression, and thereby avoid the danger of tearing the nut asunder. Secondly, in casting the faces of the flanges of the nut and of the sleeve upon chills; the object of this is to harden them, and thereby give to them greater endurance against wear and abrasion; it also gives them a smoother and more even surface than where they are cast on a sand facing. Thirdly, in making the sleeve in which the nut revolves in one piece instead of two, as is usually done; the object of this is to give a smooth and unbroken bearing-surface between the nut and sleeve, and thereby avoid the unequal wear incident to the sleeve made in two parts. Fourthly, in securing the upper and lower parts of the press to each other by means of bolts running entirely through them; and the object of this is to relieve the frame-work of the press from the strain usually thrown upon it.

A is the wooden frame-work of the press, the upper beam B of which is divided lengthwise into two parts. C is the follower, attached to the lower end of the press-screw D. The nut E has near its lower end, and for the purpose of receiving the pressure thereon, a flange, F, the face of which is cast upon a chill to harden it. An annular groove is formed in this flange for receiving anti-friction balls, or, where these balls are dispensed with, for holding tallow or other lubricating substances. In the extension of the nut below the flange F the threads are formed for working upon the screw D. The upper portion G of the nut is made without any threads. It extends through the sleeve J and is secured to the flanged plate H by the key I. J is a sleeve, made in one piece, in which the nut E revolves. It is secured in an opening in the divided beam B by means of its two flanges, the lower one, K, having a groove upon its face to correspond with the flange F, and is also cast upon a chill. L L are anti-friction balls interposed between the flanges F and K for the purpose of relieving them of a portion of the friction when a pressure is thrown upon them. M is the cross-beam of the levers N N, and is secured to the flanged plate H by means of screw-bolts. O O O O are bolts running through from the top to the bottom of the frame-work of the press.

Motion being imparted to the nut E by means of the levers N N the material placed under the follower C upon the screw D, is subjected to pressure. The anti-friction balls L L being interposed between the flanges F and K, or where these balls are not used, the lubricant in the annular grooves materially reduces the friction between these flanges. By constructing the sleeve J in one piece, and thereby dispensing with the joints usually made across the face of its lower flange I still further reduce the friction and overcome the unequal wear of the flange K. This is more especially the case where the anti-friction balls are used, as they crumble away the edges of the joints and make a depression that retards the proper action of the balls.

In the nut made in the ordinary way—that is, with its thread made above the bearing of the flange, and without the prolongation under it, as herein described—the tendency of the strain thrown upon it is to break off the flange. This tendency I overcome by placing the strain below the flange, and only subject the part of the nut above it to the torsional strain imparted by the levers.

What I claim as my invention is—

1. The combination, with the screw D, of the elongated nut E provided with chilled flange F and sleeve G, and sleeve J provided with chilled flange K, all constructed and arranged to operate with anti-friction balls L L, as and for the purpose herein set forth.

2. In the press herein described, the arrangement of the nut E and sleeve J with the screw D, follower C, cross-beams M, and levers N, all constructed and operating as and for the purposes specified.

ALEXANDER McGOWEN.

Witnesses:
JOHN MONROE,
W. A. DALY.